INVENTOR.
CLAUDE H. NICKELL
BY
WILSON, SETTLE & CRAIG
ATTORNEYS

INVENTOR.
CLAUDE H. NICKELL
BY
WILSON, SETTLE & CRAIG
ATTORNEYS

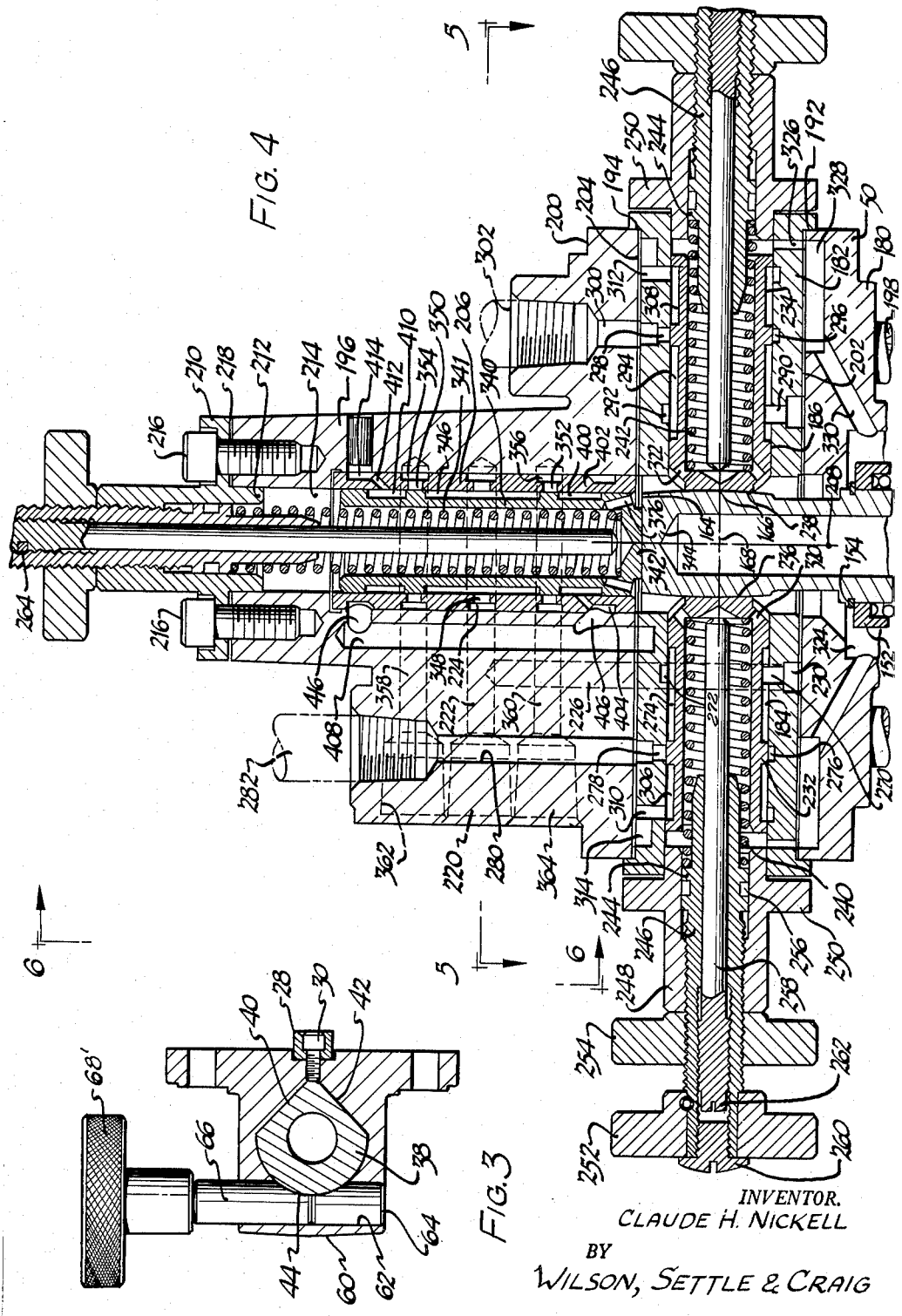

Feb. 15, 1966   C. H. NICKELL   3,235,222
TRACER EQUIPMENT
Filed July 21, 1961   5 Sheets-Sheet 4

INVENTOR.
CLAUDE H. NICKELL
BY
WILSON, SETTLE & CRAIG
ATTORNEYS

Feb. 15, 1966　　C. H. NICKELL　　3,235,222
TRACER EQUIPMENT
Filed July 21, 1961　　5 Sheets-Sheet 5

INVENTOR.
CLAUDE H. NICKELL
BY
WILSON, SETTLE & CRAIG
ATTORNEYS

United States Patent Office 3,235,222
Patented Feb. 15, 1966

3,235,222
TRACER EQUIPMENT
Claude H. Nickell, 17809 Oakwood Blvd.,
Dearborn, Mich.
Filed July 21, 1961, Ser. No. 125,873
2 Claims. (Cl. 251—3)

This invention relates to hydraulically actuated tracer or pickup units, and more particularly to the control of machine tools for profiling or duplicating the contour of a master form such as a pattern or mold.

In duplicating on the surface of pattern, die, mold or other similar members the contour of a master shape or form, it is highly desirable that the movement of the element controlled by the tracer or pickup unit respond accurately to changes in the contour of the master model without exerting undesirable force on the surface of the master model. Many types of tracer or pickup units have heretofore been developed, but none of them has embodied a desired degree of sensitivity to permit a high degree of accuracy of control.

An object of my invention is to provide a tracer or pickup unit controlled by a stylus movable relative to the surface of a model being duplicated to control the actuation of valve members directing the flow of fluid under pressure to move machine tool carrying members in accordance with variations in the contour of the member being duplicated.

Another object of my invention resides in the provision of a spherical support mounting for a stylus or pickup unit whereby movement of the stylus in one plane will not impose a movement on the valves controlling movement in the other planes and vice versa.

Another object of my invention is to provide valves controlling hydraulic motors for actuating machine tool carrying members in a plurality of planes and wherein movement of the stylus member to actuate one set of valves does not influence the valves controlling the movement of machine tool carrying members in the other direction.

A further object is to provide a three-dimensional tracer or pickup control unit wherein movement of valves controlling vertical movement does not influence the position of valves controlling movements in the horizontal directions.

Yet another object of my invention is to provide a tracer unit wherein the stylus is restrained from rotating as it moves over the surface of the member being duplicated.

Another object is to provide a tracer unit having a counterbalanced stylus member, the foot of which is supported by a buoyancy spring to overcome non-uniformity of operation resulting from the foot of the stylus.

Still a further object of my invention is to provide a stylus member supported between oppositely acting springs in such a manner that the resultant force exerted by the springs can be controlled to induce the stylus to follow the surface of a member being duplicated, the stylus being controlled to exert very little pressure, thereby making it possible to duplicate relatively soft surfaced members.

Still another object of my invention resides in the provision of a novel arrangement of flowing fluid under pressure through valves controlled by the position of a stylus to accurately control fluid motors controlling the position of a machine tool carrying member.

Still a further object is to provide separate one way valves yieldingly urged into engagement with a valve actuating member controlled by a stylus in such a manner as to maintain zero backlash in the control of the valve members, thereby making it possible to maintain valve porting within extremely close tolerances.

Still another object is to provide a valve control mechanism actuated by a valve actuating member whereby yokes and slides operably connected to permit multi-directional movement of the stylus bar are eliminated.

Another object resides in the provision of a novel method of actuating a valve controlling vertical movement of machine tool members wherein the contact between the valve and the stylus actuated member is on an arc about which the stylus member moves, thereby rendering it possible for the stylus controlled member to actuate valve members controlling horizontal movement of machine tools without varying the vertical position of the valve controlling vertical movement thereof and vice versa.

Another object resides in the provision of a novel method of actuating a valve controlling horizontal movement of machine tool members wherein the contact between the valve and the stylus actuated member is on an arc about which the stylus member moves, thereby rendering it possible for the stylus controlled member to actuate valve members controlling vertical movement of machine tools without varying the horizontal position of the valve controlling horizontal movement thereof and vice versa.

Yet a further object resides in the provision of a novel method of directing oil under pressure to the two valves controlling vertical movement and multi-direction horizontal movement.

A further object of my invention resides in the provision of an accurate control of valves actuated by a stylus wherein fluid under pressure is maintained available for delivery upon movement of any of the valve members to control the position of the tool carrying member.

A further object of my invention is to provide a valve mechanism for controlling a fluid motor wherein opposite sides of the motor are subjected to fluid pressure, and as increased pressure is exerted on one side a corresponding movement of another valve permits a controlled flow back to permit movement of the piston in the motor.

Another object of my invention is to provide an accurately controlled duplicating or tracer unit wherein the fluid pressure is exerted on opposite sides of a piston to induce accurate duplication by metering the escape of fluid from one side of the piston proportional to the flow of fluid into the opposite side.

Other objects of this invention will appear in the following description and appended claims, reference being had to the accompanying drawings forming a part of this specification wherein like reference characters designate corresponding parts in the several views.

In the drawings:

FIGURE 3 is a section view taken substantially along the line 3—3 of FIGURE 2 looking in the direction of the arrows;

FIGURE 4 is a vertical sectional view illustrating the details of construction of the valve assembly;

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 7:
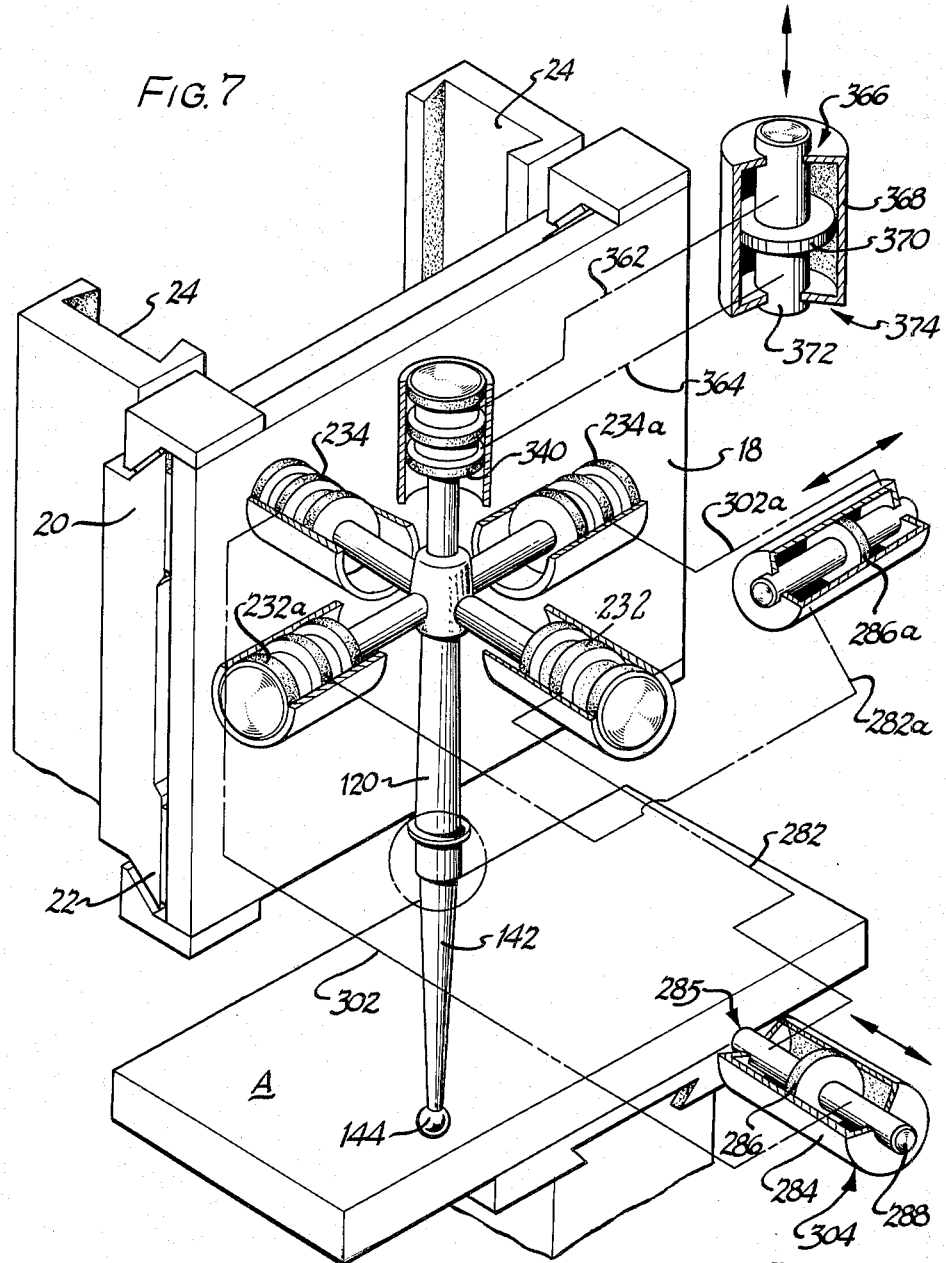
FIGURE 7 is a schematic pictorial view showing the inter-relationship of parts of the valve assembly and stylus of the apparatus of the present invention.

Referring now more particularly to FIGURE 7 it will be noted that my improved 3-dimensional pickup or tracer unit generally includes five valve elements for actuating a 3-dimensional power cylinder to move tool carrying members in three planes.

The support structure

Figure 2:
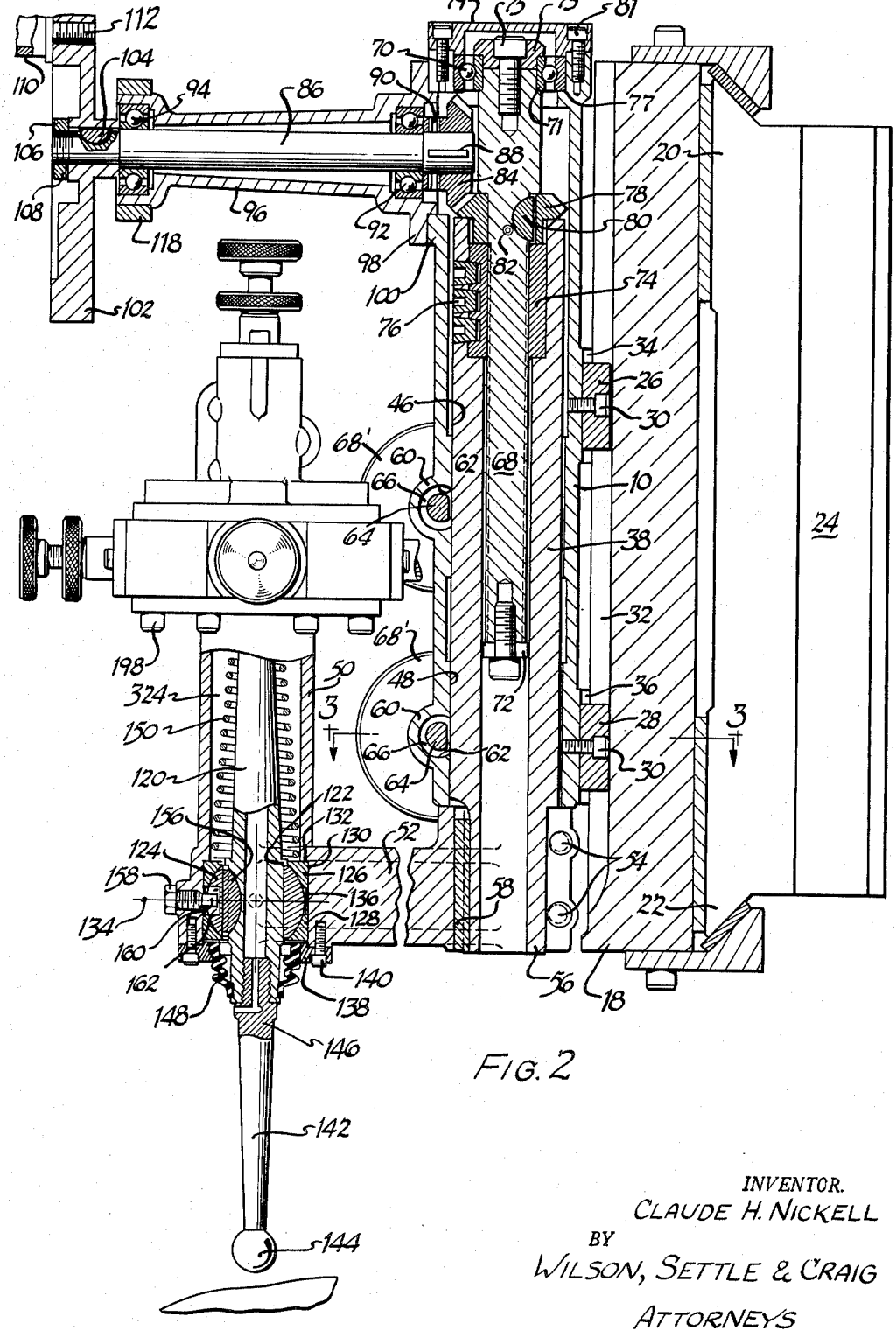
FIGURE 2 is a partial sectional view taken substantially on the line 2—2 of FIGURE 1 looking in the direction of the arrows.

A tubular housing 10 is provided with upper and lower pads 12 and 14 adapted to be secured by bolts 16 to a tool-carrying cross slide 18, FIGURE 2, mounted on horizontal ways 20 and 22 of a vertical slide assembly 24.

Upper and lower keys 26 and 28 secured to the tubular housing 10 by suitable cap screws 30 are mounted in a vertical keyway 32 in the cross slide member 18. The upper and lower keys 26 and 28 are also mounted in upper and lower keyways 34 and 36 formed in the tubular housing 10. The upper and lower keys 26 and 28, accurately position alignment of the tubular housing 10 relative to the tool carrying cross-slide 18.

It is thus possible to accurately locate the position of any movement regarding such element relative to one or more work spindles.

As shown in FIGURE 3, the tubular housing 10 accommodates a vertically movable hollow column 38 having angularly related guide surfaces 40–42 on one side and a circular peripheral surface 44. The column 38 is supported at vertically spaced areas 46 and 48 within the interior of the tubular housing 10 to permit vertical movement of the column 38 within the housing 10 while maintaining desired alignment. The lower end of the column 38 is provided with a main body 50 having a bracket 52 clamped as by bolts 54 about a reduced section 56 of the column 38, and locked against rotational movement thereon by a key 58 slideably mounted in cooperating keyways formed between the bracket 52 and reduced section 56 of the column 38.

It will be noted that the vertically spaced areas 46 and 48 are formed at bosses 60. The bosses 60 are bored at 62 and screws 64 and coacting sleeves 66 are slidably mounted therein. By means of hand wheels 68', the screws 64 may be threaded to exert a force with the sleeves 66 to compress column 38 toward surfaces 40 and 42 to maintain accurate surface contact between the angular guide surfaces 40 and 42 and insure accurate alignment of column 38 relative to tubular housing 10. This also has the effect of aligning body 50 with tubular housing 10.

Coaxially mounted within the column 38 is a feed screw 68 journaled in a suitable bearing 70, mounted in the upper end of tubular housing 10.

It will be noted that the inner race of the bearing 70 rests against a shoulder 71 formed on the upper end of the feed screw 68. A shouldered cap 73 is secured to the top end of feed screw 68 by a cap screw 75 to secure the top end of the feed screw within the inner race of bearing 70. The outer race of the bearing 70 is retained against axial movement by a shoulder 77 formed in the housing 10. Axial movement of bearing 70 in either direction is prevented by a cap 79 secured in place by cap screws 81 threaded into the housing 10.

The lower end of the feed screw 68 is guided by a combination stop and guide member 72 which has a sliding rotational fit within the bore of the column 38.

The column 38 receives a bronze bushing 74 in a press fitting engagement therewith. The bushing 74 is maintained against radial and angular movement in column 38 by means of three tapered socket head pipe plugs 76. The column 38 is drilled and threaded for the taper plugs 76 after the bushing 74 has been positioned in place therein and the bushing is threaded simultaneously with the column 38 to the extent indicated. After the column and bushing both have been drilled, they are tapped and the plugs 76 are then inserted to accurately lock the bushing in place. It will be noted that the plugs 76 are provided with tapered threads so as to more tightly engage the column 38 and bushing 74 as the plugs are turned to the setting position.

Figure 1:
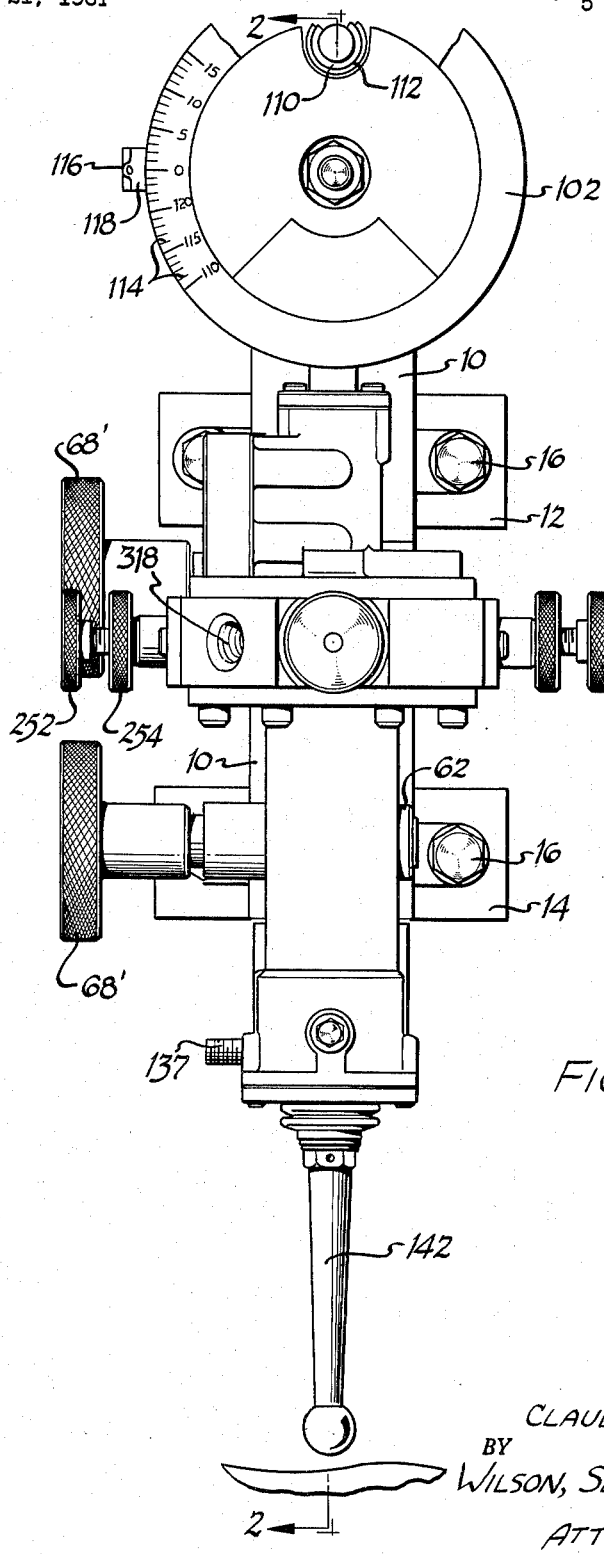
FIGURE 1 is a front elevational view of a machine embodying my invention.

The bushing 74 is internally threaded to receive external threads formed around the feed screw 68. The feed screw 68 is provided with a miter gear 78, locked against rotation on feed screw 68 by a key 80; a roll pin 82 projects through the feed screw 68 and the hub of the gear 78 to maintain angular location of the gear 78 on the feed screw 68 and with a miter gear 84 secured to a hand feed shaft 86 in a generally similar manner by key and roll pin members 88 and 90 respectively. The hand feed shaft 86 is journaled in bearings 92 and 94 in a housing 96 having a radial flange 98 secured to the radial boss 100 formed on the tubular housing 10. The hand feed shaft 86 is provided with a hand wheel 102 locked against rotation by a key 104 and locked in place by a nut 106 through which a desired degree of preload can be exerted on the bearings 92 and 94, a lock washer 108 being provided to insure against undesired loosening of the nut 106. The hand wheel 102 is provided with hand sleeve 110 mounted on an axle 112 secured in the hand wheel 102. The hand wheel 102, illustrated in FIGURE 1, is provided with suitable graduations 114 which may be aligned to zero line 116 carried by a bracket 118 adjustably clamped on the outer end of the housing 96.

Vertical adjustment

The column 38 is illustrated in FIGURE 2 as being in the upper-most position, the upper end of the bushing 74, engaging the lower face of the gear 78. The main body 50, secured to the column 38, may be moved downwardly on column 38 by releasing the locking clamps provided by elements 64 and 66 by loosening of the hand wheels 68'. The hand wheel 102 may then be rotated in a desired direction through the gears 84 and 78 to rotate the feed screw 68 within the bushing 74 to move the column 38 and the main body 50 downwardly within the tubular housing 10 until the lower end of the bushing 74 carried by the column 38 contacts the guide member 72 carried by the feed screw 68 which thus provides the lower stop. The main body 50 and column 38 thus have a limit of travel equal to distance between the lower end of the bushing 74 and guide member 72 as viewed in FIGURE 2.

The main body

The main body 50 is hollow for the reception of a valve actuating member 120 having a shoulder 122 adapted under certain conditions to engage a ball cone 124 interposed between upper and lower ball cup members 126 and 128, positioned in a counterbore 130 in the main body 50. The upper ball cup member 126 engages a shoulder 132 defining the upper limit of movement. To maintain a desired center line 134 through the ball cone 124 and the valve actuating member 120, a yieldable cup spacer 136 is interposed between the ball cup members 126 and 128 and is compressed to a predetermined degree of preload by a retainer cap 138 secured to the main body 50 by cap screws 140. A pickup tap or stylus member 142 has a rounded end 144 which may be of any desired radius. The rounded end 144 contacts the surface of a master pattern of a model to be duplicated. The stylus 142 is threaded into the valve actuating member 120 and has a shoulder 146 engaging the end of the valve actuating member to maintain the desired degree of alignment between the center lines of the valve actuating member 120 and the stylus 142. A flexible boot 148, engaging the lower end of the valve actuating member 120, is carried by the radial cap 138 to prevent oil from seeping along the valve actuating member 120 and stylus 142 to the pattern being duplicated and also prevent dirt from reaching the ball cone assembly 124.

A buoyancy spring 150 has its lower end abutting the upper ball cup 126. The spring 150 has its upper end received within a spring seat 152, FIGURE 4, secured to the valve actuating member 120 and is retained in place thereon by a keeper 154. The buoyancy spring 150 is loaded to substantially support the weight of the valve actuating member 120 and the weight of the stylus 142 and the compressive force of the boot 148. The valve actuating member 120 is prevented from rotating by means of a key 156, received within a keyway formed in the ball cone 124, the ball cone being prevented from rotating within the main body 50 by means of a dog screw 158 having a projection 160 extending into an elongated slot 162 formed in the ball cone 124.

The upper end of the valve actuating member 120 has an upper surface 164, FIGURE 4, which is an accurately ground spherical surface generated from the center line 134 through the valve actuating member 120, using the distance between the center line 134 and the upper end of the valve actuating member 120 as a radius. The side surfaces 166 of the upper end of the valve actuating member are barrel shaped, being generated using a distance equal to the distance between the center line 168 and the center line 134 as a radius.

General function

My improved tracer unit is adapted to trace a pattern that is three-dimensional in form, the stylus 142 shifting the valve actuating member 120 in response to variations in contour on the master pattern or mould being duplicated to move the slide 18, carrying the tracer unit, longitudinally or vertically and to operate the cross slide in a fore and aft manner. Thus 3-dimensional movement is provided by my improved tracer.

It will, of course, be understood that when this tracer unit is applied to machines which do not require movement in three planes, the valves controlling the movements at the planes which are not used will be locked thereby rendering them inoperative.

The valve assembly

As more clearly shown in FIGURE 4, the valve actuating member 120 controls the valve assembly consisting of four (4) one-way valves positioned at right angles to the axis of the valve actuating member 120 and positioned at substantially right angles relative to each other. Also, a two-way valve and sleeve assembly is provided to control movement vertically.

Two of the horizontally disposed one-way valves are illustrated in FIGURE 4 it being apparent that the other two one-way valves will be positioned at substantially 90° angular relation to the valves illustrated.

The main body 50 has a flange 180 which accommodates the circular horizontal valve body 182 having radially extended bores 184, 186, 188 and 190.

The valve body 182 is located relative to the flange 180 by a suitable dowels interposed between the bores 184, 186, 188 and 190 to retain the valve body against circumferential movement relative to the flange. The valve body 182 is counterbored at 192 to receive the pilot diameter of the flange 180 to centeringly locate the valve body relative to the main body 50. The upper surface of the valve body 182 is also counterbored as illustrated at 194 to receive the pilot diameter of an upper valve body 196. The upper valve body 196 is located peripherally relative to the valve body 182 by the dowel pins previously referred to, and the assembly is secured together by cap screws 198 projecting upwardly through the flange 180 and extending through the valve body 182 into threaded engagement with a flange 200 of the upper valve body 196. It will be noted that suitable seals; i.e 202 and 204; are provided to seal the space between the valve body 182 and the lower and upper flanges 180 and 200.

The upper valve body 196 is provided with a center bore which receives a sleeve 206 having its center bore in alignment with the center of the ball cone 124.

A cap 210 has an inner pilot 212 projecting into the upper bore 214 of the upper valve body 196 and held in place by suitable cap screws 216, a gasket 218, being interposed between the cap 210 and the upper valve body 196 to seal the assembly.

Fluid under pressure is supplied from a common line to annular grooves in the four (4) horizontal valve spools in the various bores 184, 186, 188, 190 and to an annular passage in the valve sleeve 206. As shown in FIGURE 4, fluid under pressure is supplied through conduit 220 and drilled passage 222 communicating with an annular channel 224 formed on the outer periphery of the valve sleeve 206. Another bore 226, drilled from the bottom of the upper valve body 196, intersects the drilled passage 222 to provide the fluid under pressure to a passage 228, FIGURE 5, through the horizontal valve body 182, provided with annular channel 230 formed in the lower surface of the valve body 182.

Each of the valve bores 184, 186, 188 and 190 is provided with a valve spool. In view of the fact that one horizontal pair of valve assemblies is similar to the other pair of valve assemblies, positioned at right angles thereto, it will only be necessary to describe one pair of valve assemblies.

Referring now to FIGURE 4, it will be noted that valve spools 232 and 234 are positioned in the valve bores 184 and 186. Each of the valve spools 232 and 234 has a flat end 236 and 238 which engages the slightly convex actuating surfaces 166 of the valve actuating member 120. Each of the valve spools 232 and 234 is maintained in contact with the member 120 by springs 240 and 242 positioned within the valve spools, and having their outer ends in engagement with a shoulder 244 of an adjusting sleeve 246. Threaded in the outer end 248 of a cap 250, which is identical with the cap 210 heretofore described, the adjusting sleeve 246 is provided with a hand wheel 252 secured to the sleeve 246. A hand wheel 254, threaded on adjusting sleeve 246, is provided to abut the end of the cap 250 to lock the adjusting sleeve 246 against undesired rotation. A seal 256 is positioned in a groove formed in the adjusting sleeve 246. A stop screw 258 is threaded into an internally threaded section of the adjusting sleeve 246 and has its forward end projecting within the central bore of the spool 232. By removing a seal cap 260 in the end of the adjusting sleeve 246 to expose a screw driver slot 262, the stop screw 258 may be adjusted to control the extent of travel of the valve spool 232.

It will be noted that an insert 264 of nylon or other suitable material, top of FIGURE 4, may be positioned in the stop screw 258 to inhibit rotation.

An elongated slot 270 interconnects the annular channel 230 and an annular channel 272 formed in the valve body 182.

The valve spool 232 is provided with a groove 274 adapted to underlie the annular channel 272 when the valve actuating member 120 is in a neutral position to supply fluid under pressure to a point adjacent another annular channel 276, communicating through an elongated passage 278, connected with passage 280 having a conduit 282 connected to one end of a cylinder 284, FIGURE 7, having a piston 286 secured to a piston rod 288 slidably mounted therein.

Figure 5:
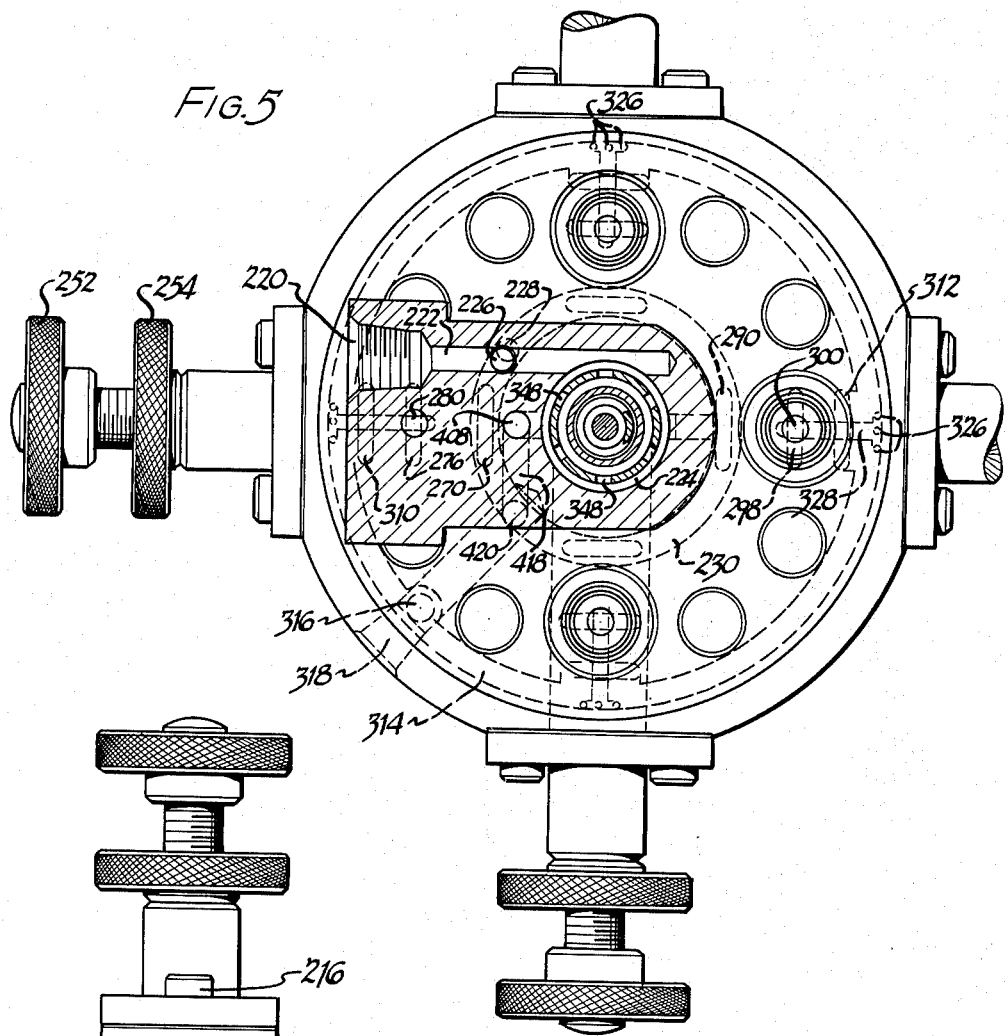
FIGURE 5 is a sectional view taken substantially on the line 5—5 of FIGURE 4 looking in the direction of the arrows.
Figure 6:
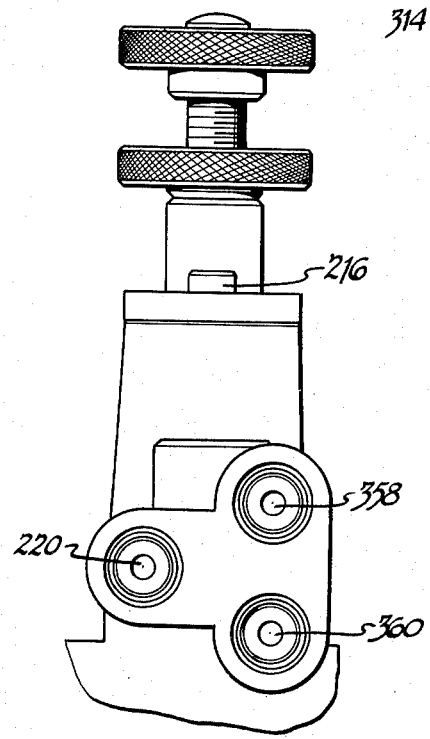
FIGURE 6 is a partial side elevational view taken along the line 6—6 of FIGURE 4, looking in the direction of the arrows.

The companion right hand valve spool 234 positioned in the bore 186 in the valve body 182 is provided with an elongated slot 290, FIGURE 5, to admit fluid under pressure from annular channel 230 into annular channel 292 corresponding with an annular channel 272. The valve spool 234 is provided with a groove 294 corresponding with groove 274 in valve spool 232 to admit fluid under pressure adjacent channel 296, corresponding to channel 276 in the valve body 182. This channel 296 is connected with an elongated passage 298, in turn connected with a passage 300 in turn connected to a conduit 302 connected to the opposite end 304 of the cylinder 284, FIGURE 7.

The passages 280 and 300 from opposite ends 285 and 304 of the cylinder 284, are adapted to be vented through annular grooves 306 and 308, formed in the sleeve spools 232 and 234 respectively communicating through passageways 310 and 312 connected with an annular channel 314 formed in the upper surface of the valve body 182 and communicating with each of the four valve bores 184, 186, 188 and 190 through suitable passageways. As shown in FIGURE 5, the annular channel 314 is adapted to be drained through a passage 316 communicating with a radial passage 318.

It will be noted that the valve spools 232 and 234 are provided with a plurality of vent holes 320 and 322 to the space 324 within the main body 50 outside of the valve actuating member 120. The interior of the valve assemblies embodied in valve body 182 are vented through passages 326 communicating with a groove 328 formed in the main body 50 communicating through passages 330 extending to the space 324 within main body 50.

The remaining pair of one-way valves, as previously mentioned, is similar in configuration and function to the one-way valve spools 232 and 234 positioned in the bores 184 and 186 and are connected to a cylinder and piston assembly 286a, FIGURE 7, by means of lines 282a and 302a to valve spools 232a and 234a, corresponding to the valve spools 232 and 234.

*Function of valves 232 and 234 and 232a–234a to provide four-way horizontal movement*

It will be apparent from the foregoing that movement of the valve actuating member 120 will actuate the valves 232–234 and 232a–234a because of its intimate contact with the ends thereof. Such actuation is effective to move each of pistons 286 and 286a in two directions, depending upon the pressurized fluid directed thereto. Thus, actuation of valve 232 admits fluid to line 282 causing piston 286 to move to the right of FIGURE 7. Actuation of valve 234 causes movement to the left. This is effective to move the table A in a fore and aft manner Similarly, movement of valves 232a and 234a will cause cylinder 286a to move in right or left hand directions and thus move slide 18 correspondingly.

As will be subsequently described, the vertically disposed two-way valve 340 is effective to move slide 18 vertically. Thus, vertical, lateral and fore and aft movement is provided by the two sets of one-way horizontal control valves and the single two-way vertical control valve.

*Zero backlash feature*

It is an important aspect of the present invention that the cooperating one-way valve assemblies 232–234 and 232a–234a provide zero backlash as contrasted to yoke assemblies heretofore used in the prior art. By reference to FIGURE 4 of the drawings, it will be observed that the springs 240 and 242 load the valve spools 232 and 234 into intimate and direct contact with the barrel-shaped surfaces of the upper end of the valve actuating member 120 and retain the spools in positive engagement with the valve actuating member at all times. Thus there is absolutely no clearance or "slop" between the valve spools and the valve actuating member as in prior art machines where clearance spaces between all components including operator, yoke and spool were provided. This means that the valves are always in positive and direct control of the valve actuating member 120 and no clearance has to be overcome before valve actuation is effected. Accordingly, there is no tendency for the machine to "hunt" as has been the case in prior art yoke-type machines whose mechanisms have included clearance spaces.

*Vertical movement*

The vertical movement of the stylus 142 occasioned by a vertical changing contour of the master pattern results in a force exerted on the round end 144 of the stylus 142 to elevate the valve actuating member 120, the valve actuating member sliding through the ball cone 124 in the main body 50. Vertical movement of the valve actuating member 120 is effective to exert an upward force on a two-way valve spool 340, having a substantially flat end 342 engaging the convex curved surface 344 of the valve actuating member 120.

The valve spool 340 has an elongated groove 346 overlying a plurality of holes 348, interconnecting annular channel 224 to fluid passages as heretofore described to admit fluid pressure at all times to the elongated groove 346.

In a neutral position of the stylus 142, relative to the master model being reproduced, the valve spool 340 is in a neutral position where the opposite ends of the groove 346 overlap adjacent passages 350 and 352, communicating with annular channels 354 and 356. The annular channels 354 and 356 communicate through holes 358 and 360 and the upper annular channel 354 is supplied with fluid under pressure when valve spool 340 is elevated, whereupon fluid under pressure is supplied through the conduit 362 connected to the upper end 366 of a cylinder 368, FIGURE 7, which is anchored to the vertical slide of the machine and having a piston 370 slideably mounted therein and connected to a rod 372. The piston rod 372 is grounded to a stationary part of the machine. In like manner the annular channel 356 is connected to the passage 360 and the conduit 364 to the lower end 374 of the cylinder 368 to subject the lower end of the piston 370 to pressure when valve spool 340 is lowered by spring 341, occasioned by a downward movement of the valve actuating member 120 resulting from a lowering of a contour of the master pattern being duplicated.

*Highly sensitive vertical control*

At this point it should be noted that spring 341 overrides buoyancy spring 150, FIGURE 2, with enough force to shift stylus 142 and valve 340 down, thus actuating piston 370 and cylinder 368 for downward movement of slide 18 until the stylus makes contact. At that point the stylus and the valve 340 are neutralized and the valve 340 is centered. This provides a highly sensitive control for the unit, since the valve spring can be selected to override buoyance spring 150 by a very small amount on the order of a few pounds.

Thus, upward movement of valve spool 340 is effective to cause the slide 18 to be moved vertically upwards on the ways 24, and downward movement of the valve spool 340, occasioned by downward movement of the valve actuating member 120 resulting from a lowering of a contour of the master pattern being duplicated, is effective to move the slide 18 vertically downwardly on the ways 24.

*Venting the spool 340*

As shown in FIGURE 4, vent passages 376 are provided through the bottom end of spool 340 to connect with space 324 surrounding the valve actuating member 120, to drain any seepage that may pass to the interior of the spool 340. Any seepage into this space 324 surrounding actuator 120 from any of the valve assemblies passes downwardly around actuator 120 over the top of key 156 to centerline 134 then around ball cone 124 and out the compressible member 136. The drainage then passes through a drain hole 137, FIGURE 1, provided slightly below centerline 134 in main body 50. The seepage is effective to lubricate the entire mechanism supporting the lower end of the actuator 120 and thus serves a valuable function in the present device.

*Return flow description*

Return flow of fluid through the upper two-way valve spool 340 is effected as follows. If, for example, the spool 340 is moved upwardly, the passage 350 is opened to high pressure actuating flow from passage 346; the flow then proceeds to annular passage 354 and line 362 to the upper end 366 of cylinder 368. Return flow from the lower end 374 of cylinder 368 flows through line 364 to passage 360, thence to passages 356 and 352 to lower annular channel 400 of spool 340. Annular channel 400 connects with angularly extending passage 402 which extends to annular channel 404. The channel 404 joins with connecting passage 406 to vertically disposed exhaust passage 408.

When the spool 340 is moved downwardly, the passage 352 is opened to high pressure actuating flow from passage 346 and thence to annular passage 356, passage 360 to line 364 and thence to the bottom end 374 of cylinder 368. Return flow from the upper end 366 of cylinder 368 passes through line 362, passage 358, annular channel 354, drilled passage 350 and into upper annular channel 410 and angular passage 412, connecting annular passage 414 to linking passage 416 and the vertically disposed exhaust passage 408. Passage 408 connects with horizontal passage 418, FIGURE 5, vertical passage 420 and thence to horizontal bore 318 which is a common exhaust duct back to the pump supplying fluid to the circuit.

Having thus described my invention, I claim:

1. In a hydraulically actuated tracer unit, a housing, an elongated valve actuator, means pivotally mounting said actuator member in said housing at a point intermediate its ends, means within said pivot means mounting said valve actuator for longitudinal movement, said valve actuator having one end within said housing, an axially extending spherical surface on the housing end of said valve actuator and a radially extending arcuate surface adjacent said spherical surface, at least one one-way valve in said housing having a spool positioned perpendicular to the axis of said valve actuator, said one-way valve spool having a flat end and means urging said flat end of first valve spool into positive contact with said spherical surface, a two-way valve in said housing having a spool positioned in coaxial alignment with said actuator, said two-way valve spool having a flat end and means urging said flat end of said second valve spool into positive contact with said arcuate surface, whereby transverse movement of said valve actuator imposes movement on said one-way valve spool without imposing movement on said two-way valve spool and longitudinal movement of said valve actuator imposes movement on said two-way valve spool without imposing movement on said one-way valve spool.

2. In a hydraulic tracer unit,
a housing,
an elongated valve-actuating member having one end formed as a tracer stylus,
means mounting said member for pivotal and longitudinal movement at a point intermediate the ends within said housing and with said stylus exposed to engage a work piece to be copied,
an axially extending spherical surface on said actuator,
a valve carried by said housing and including a spool with an end configured to contact said spherical surface at a point and with said end in engagement with said spherical surface,
means urging said spool end into continuous contact with said spherical surface,
a radially extending arcuate surface on the housing end of said actuator,
a valve having a spool with a flat end positioned in engagement with said spherical surface,
and means urging said flat end into continuous contact with said spherical surface.

References Cited by the Examiner

UNITED STATES PATENTS

| | | | |
|---|---|---|---|
| 1,124,203 | 1/1915 | Bingley | 251—285 X |
| 2,239,625 | 4/1941 | Roehm | 251—3 X |
| 2,347,368 | 4/1944 | Rosen | 91—413 |
| 2,618,244 | 11/1952 | Roehm | 251—3 X |
| 2,620,823 | 12/1952 | Adams | 251—3 |
| 2,738,712 | 3/1956 | Gill | 90—13.5 |
| 2,741,952 | 4/1956 | Roehm | 90—13.5 |
| 2,745,624 | 5/1956 | Turchan | 251—3 |
| 2,835,466 | 5/1958 | Rosebrook | 251—3 |
| 2,841,356 | 7/1958 | Glaser | 251—3 |
| 2,994,502 | 8/1961 | Ruzick | 251—3 |

FOREIGN PATENTS

| | | |
|---|---|---|
| 830,929 | 1960 | Great Britain. |
| 832,577 | 1960 | Great Britain. |

ISADOR WEIL, *Primary Examiner.*

LEON PEAR, *Examiner.*